Feb. 3, 1970
G. ISELI  3,493,277
DISMOUNTABLE SHELL FOR A PIVOT POINT
Filed Dec. 13, 1967
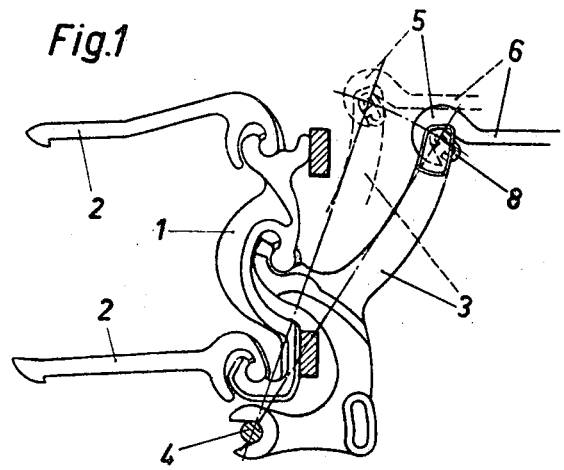
Fig.1
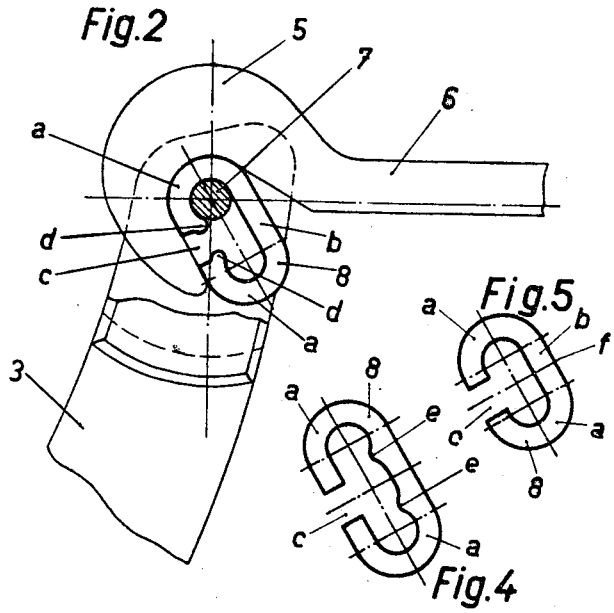
Fig.2
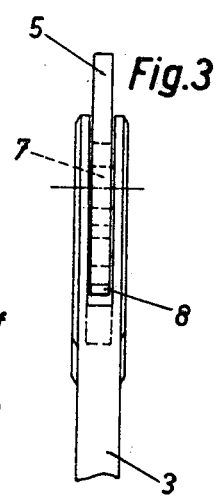
Fig.3
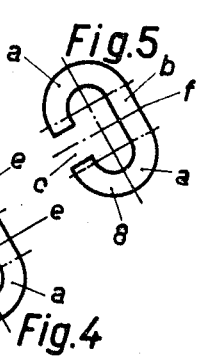
Fig.4
Fig.5

United States Patent Office 3,493,277
Patented Feb. 3, 1970

3,493,277
DISMOUNTABLE SHELL FOR A PIVOT POINT
Gottfried Iseli, Horgen-Zurich, Switzerland, assignor to Gebr. Staubli & Co., Horgen, Switzerland, a company of Switzerland
Filed Dec. 13, 1967, Ser. No. 690,341
Claims priority, application Switzerland, Dec. 13, 1966, 17,750/66
Int. Cl. F16c 35/00, 33/00; D03d 1/06
U.S. Cl. 308—24                               9 Claims

ABSTRACT OF THE DISCLOSURE

An easily removable bearing liner or bushing for hook type pivot joints which are used in mechanisms comprises an elongated partial ring member having an opening which is proportioned so that the elongated ring may be placed on the pin portion of the pivot joint. The inner surface of a first end portion of the ring is proportioned so as to encircle at least one half the circumference of the pin and the outer surface is proportioned to conform to the inner surface of the hook. An opposite end portion of the elongated ring has inner and outer surfaces similarly proportioned so that when the first portion becomes objectionably worn through use of the mechanism, the bearing bushing may be moved so that fresh portions are brought to bear against the pin and the hook, thus increasing the useful life of the bushing. Preferably protuberances are formed in the ring adjacent to the opening and proportioned so that the ring must be manually forced over the pin, thus preventing accidental removal of the bushing. These protuberances extend into the ring so as to partially encircle the pin and thus maintain the position of the ring against the pin. The ring can not be moved away from the pin in a radial direction once the hook is installed and the ring sets itself in the most favorable operating position. The ring may be formed of a resilient plastic material, a self lubricating bearing material or steel.

---

The invention relates in general to bearings, and more particularly to pivot bearings with removable liners or bushings.

As a result of the constant increase in the operating speed of machines, individual parts are being subjected to ever increasing stresses. This is particularly the case at pivot bearing points where varying tensile loads are present in addition to oscillating movement. These stresses call for solutions which on the one hand make for less wear with better sliding action and less servicing and, on the other hand, permit simple mounting and dismounting for replacement of the worn parts.

Bearing shells or bushings of special material, usually self-lubricating material, bearing metal or synthetic plastic material are already known, but their installation is complicated so that they can only be replaced by an expert. In addition they must be connected either rigidly to the shaft or to the part surrounding the shaft. Signs of severe wear occur especially in hooks which swing to and fro on a spindle, necessitating replacement of the entire hook.

A typical example of such a pivot is the connection of the jack lever of a dobby to the shaft mechanism in a loom, in which the width of the hook is limited by the pitch of the dobby. It has been attempted to make the hook of steel and then of synthetic plastic instead of cast iron but hook breakages have continued to occur resulting in great disturbances in operation.

It is an object of this invention to provide a hook and pin type oscillating bearing with an easily removable bearing bushing.

Another object of this invention is to provide a single bushing having at least two bearing portions with the second portion useable after the first is objectionably worn.

Another object of this invention is to provide a self seating bushing easily installed and removed by manual means.

Other objects and a fuller understanding of the invention may be had by referring to the following description and claims, taken in conjunction with the accompanying drawing in which:

FIG. 1 is a side elevation of the shaft lifting mechanism of a loom incorporating the invention.

FIG. 2 is an enlarged longitudinal cross sectional view of the pivot bearing portion of the mechanism shown in FIG. 1.

FIG. 3 is a front elevation of the pivot bearing portion shown in FIG. 2.

FIG. 4 is a side view of a bushing according to the invention.

FIG. 5 is a side view of an alternative construction of a bushing according to the invention.

The dismountable bushing for a pivot, which undergoes oscillating or swinging motion, and which has a hook encircling a rigid pin, shown by way of example in the drawing, is characterized in that the dismountable bushing disposed between pin and hook has the configuration of an elongated ring having an inlet opening on its longitudinal side.

With reference to the drawing, the dobby mechanism illustrated in FIG. 1 comprises a baulk 1 to the ends of which are linked hooks 2 and to the entire of which is linked a jack lever 3. The jack lever is swingably mounted on a stationary shaft 4 and FIG. 1 shows the arrangement in the low shed position of the shaft. The position of the jack lever in the high shed position is indicated in dotted lines. A connecting bar 6 between the dobby and the shaft has a hook 5 which is hooked on to the free end of the jack lever 3. The end of the jack lever is forked, one half being omitted in FIG. 2, and bears a pin 7 which extends across between the two sides of the fork. Between pin 7 and hook 5 lies the shell or bushing 8 according to the invention which has the basic shape of an elongated ring in the three embodiments illustrated in FIGS. 2, 4 and 5.

The shell 8 has two identical portions $a$, curved substantially to approximately a semicircle, i.e., about 170°– 190°, whose inside curvature corresponds to the curvature of the pin 7 and whose outer curvature corresponds to the inside curvature of the hook 5. One arm of each curved portion $a$ is connected to a straight portion $b$ while the other arms of the curved portions form an opening $c$ for the pin 7.

In the embodiment illustrated in FIG. 2, the arms forming the insert opening $c$ have projections $d$ which on the one hand are adapted as continuations of the inside curvature of the curved portion $a$ in excess of half the circumference and on the other hand provide a slight constriction in the insert opening. Because of these projections there is a constriction in the inlet opening to the inner part of the curved portion of the ring, the internal dimension of which is somewhat smaller than the diameter of the pin 7 so that the pin can only be pushed through with pressure. To achieve this, the shell must be able to spring open slightly. Dismounting of the shell also requires flexibility. As can be seen from FIG. 2 such a springing open is no longer possible when the hook 5 encircles the shell 8. In the operational state the shell is thus secured. After removing the hook 5, the shell 8 can easily be detached from the pin 7, and moreover, in the radial direction. After wear of one portion $a$, the shell 8 can be turned around to bring the other portion *a* into the working position.

In this constructional example according to FIG. 5, there is no construction and thus no additional securing of the shell. In contrast, construction and fastening are present, in the assembled state, in the embodiment according to FIG. 4 by means of the two projections *e* which reduce the opening to the curved portions *a*. Another alternative is that in the embodiment according to FIG. 5 a single projection, having the same mode of operation as the projections *d*, of FIG. 2 or the projections *e* of FIG. 4 is disposed on the centerline *f* opposite the opening *c*.

The inside curvature of the curved portion *a* of the shell 8 which corresponds to the curvature of the encircled pin 7 preferably extends at least over half the circumference of the pin 7 so that the opening between portion *b* and projection *d*, which is limited by this inside curvature is somewhat smaller than the pin diameter. The outside curvature of the curved portion *a* of the bushing 8, which corresponds to the curvature on the bottom of the hook, does not have to extend over half the circumference since the portion *a* has to be easily removable from the hook 5. However, in some instances it may be desirable that the hook 5 encircles the shell 8 by slightly more than half the circumference whereby the shell is lightly clamped in the mouth of the hook. Since the shell 8 is also clamped to the pin 7, the entire pivot is to some extent secured against loosening of individual parts. However, to facilitate assembly in this case the shell should consist of resilient material.

The bushing may be formed of self-lubricating bearing metal, spring steel or synthetic plastic material such as molybdenum disulphide filled nylon, or other plastic material having the following properties: high modulus of stiffness, high resiliency, good fatigue life, high resistance to creep, a smooth hard surface, a low coefficient of friction, good wear resistance and a high tensile strength. Suitable characteristics of the plastic material used are indicated by way of example in the following tabulation:

$MoS_2$ filled nylon (2½%):
Tensile strength (p.s.i.) _____ 10,000–14,000
Elongation (percent) _____ 5–150
Tensile modulus (p.s.i.) _____ 450,000–600,000
Hardness, Rockwell _____ 110R–125R
Impact strength, tensile (ft.-lb./sign) ____ 50–80
Deformation underload (percent) 2,000
p.s.i., 122F _____ 0.5–2.5
Heat distortion temperature (F.) at—
66 p.s.i. _____ 400–490
264 p.s.i. _____ 200–470

The bushing according to the invention can be replaced by means of a few simple manual movements. It has a great advantage in that it sets itself in the most favorable operating position. The two identical curved portions make it possible to swing the bushing through 180° after wear of one portion to obtain faultless running again. Replacement is simple. The hook is disengaged, the bushing is inverted over the pin and the hook is placed over the bushing. The outer shape of the bushing then adapts itself to the inside curve of the hook.

Although I have described my invention with a certain degree of particularity, it is understood that the present disclosure has been made only by way of example and that numerous changes in detail of construction and the combination and arrangement of parts may be resorted to without departing from the spirit and the scope of the invention as hereinafter claimed.

What I claim is:

1. A dismountable pivot bearing comprising a first member having a pin, a second member having a hook portion disposed to removably hook onto said pin and a removable bushing comprising an elongated open ring, having an inner surface portion conforming to at least about half the circumferential surface of said pin and having an outer surface portion conforming to the inner surface of said hook portion, with said bushing disposed between said pin and said hook, thus providing a dismountable pivot bearing, said ring having an opening sufficiently large to permit removal of said bushing from said pin in a radial direction, said removable bushing having the form of an elongated partial ring comprising a pair of like curved end portions connected by a longitudinal straight portion and having an opening opposite said straight portion communicating the interior of said partial ring, with said opening at least approximately equal to the diameter of said pin for the purpose of mounting said ring radially on said pin, said inner surface of said elongated partial ring having a curved portion extending to at least half the circumference of said encircled pin.

2. A dismountable pivot bearing according to claim 1, wherein said outer curved surface of said elongated partial ring is encircled by said hook to about 180°.

3. A dismountable pivot bearing according to claim 1, wherein said inner surface of said elongated partial ring has a curved portion in the form of a semi-circle of not less than 170° and not more than 180°.

4. A dismountable pivot bearing according to claim 1, wherein said bushing is provided with a protuberance directed toward the interior of said ring, with said protuberance forming a continuation of said inside curvature of said bushing with said inside curved surface conforming to the surface of said pin and extending past half the circumference of said pin so as to provide a slightly constricted aperture, through which said pin is removable by springing said bushing.

5. A dismountable pivot bearing according to claim 4, where said protuberance is provided adjacent said opening of said elongated ring.

6. A dismountable pivot bearing according to claim 4, wherein said protuberance is provided on said straight portion connecting said curved end portion of said elongated ring.

7. A dismountable pivot bearing according to claim 1, wherein the inner surface of said elongated ring has at least two curved portions each adapted to accommodate said pin thus providing an active bearing surface and a spare bearing surface.

8. A dismountable pivot bearing according to claim 6, wherein said protuberance divides the inner surface of said ring into two curved portions each adapted to accommodate said pin thus providing an active bearing surface and a spare bearing surface.

9. A dismountable pivot bearing according to claim 1, wherein said removable bushing comprises a partial ring having an inner surface with said inner surface having a plurality of portions each conforming to the surface of said pin.

References Cited

UNITED STATES PATENTS 2,931,477  4/1960  Metzgar _____ 308—238 XR
3,307,291  3/1967  Cremer _____ 308—14 XR

FOREIGN PATENTS 568,839  1/1933  Germany.

KENNETH W. SPRAGUE, Primary Examiner

U.S. Cl. X.R.,

139—71; 308—258